United States Patent [19]
Kitchen

[11] Patent Number: 5,458,939
[45] Date of Patent: Oct. 17, 1995

[54] REPAIR PATCH FOR VERTICAL BLIND SLATS

[76] Inventor: Wallace R. Kitchen, 11017 Speaks Ct., Midlothian, Va. 23112

[21] Appl. No.: 203,319

[22] Filed: Mar. 1, 1994

[51] Int. Cl.[6] ................................................ B32B 35/00
[52] U.S. Cl. .................. 428/40; 160/236; 160/178.1; 428/100; 428/131; 428/134; 428/220; 428/317.1; 428/317.3; 428/319.3
[58] Field of Search .................. 428/40, 100, 131, 428/134, 175, 192, 194, 220, 317.1, 317.3, 319.3; 160/166.1 R, 166.1 V, 174 R, 174 V, 178.1 V, 178.3, 236, 900

[56] References Cited

U.S. PATENT DOCUMENTS

| | | | |
|---|---|---|---|
| 3,409,257 | 11/1968 | Elm | 428/40 |
| 4,016,977 | 4/1977 | Krautsack | 428/40 |
| 4,554,193 | 11/1985 | Erickson | 428/40 |
| 4,718,962 | 1/1988 | Goodwin | 428/137 |
| 4,759,484 | 7/1988 | Richter | 428/43 |

*Primary Examiner*—Nasser Ahmad

[57] ABSTRACT

A new and improved repair patch for vertical blind slats for repairing broken or torn vertical blind slat mounting holes, the repair patch for vertical blind slats comprising a generally rectangular extruded member having a connector thereon for fixedly connecting the extruded member to the end of a vertical blind slat, the extruded member also having one or more apertures therethrough wherethrough an attachment hook of a vertical blind set may be connected whereby the vertical blind slat may be reattached to the blind set thereby restoring its original functionality.

4 Claims, 5 Drawing Sheets

REPAIR PATCH FOR VERTICAL BLIND SLATS

BACKGROUND OF THE INVENTION

1. Field of the Invention

The present invention relates to window shades and more particularly pertains to repair patches for vertical blind slats which may be adapted for repairing broken or torn vertical blind slat mounting holes.

2. Description of the Prior Art

The use of repair patches for vertical blind slats is known in the prior art. More specifically, repair patches for vertical blind slats heretofore devised and utilized for the purpose of repairing broken or torn vertical blind slat mounting holes are known to consist basically of familiar, expected and obvious structural configurations, notwithstanding the myriad of designs encompassed by the crowded prior art which have been developed for the fulfillment of countless objectives and requirements.

The present invention is directed to improving devices for repairing broken or torn vertical blind slat mounting holes in a manner which is safe, secure, economical and aesthetically pleasing.

For example, U.S. Pat. No. 4,662,770 to Block discloses a pressure sensitive reinforcement tape for a loose leaf sheet comprising a strip of plastic tape coated with a pressure sensitive adhesive and includes a plurality of holes configured for alignment with different standard mounting hole configurations and is sized to fit within the confines of the sheet.

U.S. Pat. No. 4,525,399 to Fields shows a perforated reinforcing strip for use with continuous forms having sprocket holes comprising a means for reinforcing the sprocket holes and alternatively additionally comprises means for reinforcing perforations found in said continuous forms; said article comprises a continuous pliable strip having self-adhesive disposed on one side thereof and having a row of holes disposed therein with uniform spacing therebetween. The strip additionally has perforations which are transverse to the longitudinal axis of the strip and are disposed between alternative holes of the strip.

Neither of the inventions disclosed above provide reinforcement means adequate for withstanding the weight and stresses of normal use of a vertical blind slat.

U.S. Pat. No. 4,954,378 to Goodman describes a repair kit for shower curtain and the like consisting of a reinforcing means for repairing tears in plasticized sheet material for shower curtains and liners, bath curtains, and the like comprising an elastomeric material, manipulatable as a unit, for insertion through an aperture in the sheet material adjacent a tear for adhering to each side of the sheet material around the aperture to repair and reinforce the sheet material.

U.S. Pat. No. 4,056,645 to Henry discloses an aperture reinforcing means for apertures in reinforced flexible materials consisting of a pegged washer plate. The pegged washer plate has an apertured body portion with pegs extending therefrom, and is embedded in the flexible sheet material so that the pegs mesh with threads of a layer of material reinforcing the flexible sheet material.

Both of the disclosures mentioned rely on the presence of intact material surrounding the tear or break and are therefore of limited usefulness when repairing broken or torn vertical blind slats which frequently have large portions of material missing.

The prior art also discloses a reinforcement for laminate synthetic materials as shown in U.S. Pat. No. 5,079,055 to Doyle which consists of at least two laminate layers bonded to one another, the member having a synthetic body defining a length axis X, a breadth axis Y, and a thickness axis Z, formed of a synthetic plastic material, the length and breadth axes X and Y lying in a first plane, and the thickness axis Z lying in a second place normal to the first plane, a plurality of first reinforcement fibers lying parallel to the first plane, and, a plurality of second recruitment fibers lying parallel to the second plane. The disclosure does not show a practical way for connecting to and repairing a torn vertical blind slat.

In this respect, the repair patch for vertical blind slats according to the present invention substantially departs from the conventional concepts and designs of the prior art, and in so doing provides an apparatus primarily developed for the purpose of repairing broken or torn vertical blind slat mounting holes.

Therefore, it can be appreciated that there exists a continuing need for new and improved repair patches for vertical blind slats which can be used for repairing broken or torn vertical blind slat mounting holes. In this regard, the present invention substantially fulfills this need.

As illustrated by the background art, efforts are continuously being made in an attempt to develop devices for repairing broken or torn vertical blind slat mounting holes. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of repair patches for vertical blind slats now present in the prior art, the present invention provides an improved repair patch construction wherein the same can be utilized for repairing broken or torn vertical blind slat mounting holes. As such, the general purpose of the present invention, which will be described subsequently in greater detail, is to provide a new and improved repair patch for vertical blind slats apparatus and method which has all the advantages of the prior art repair patches and none of the disadvantages.

The invention is defined by the appended claims with the specific embodiment shown in the attached drawings. For the purpose of summarizing the invention, the invention may be incorporated into a new and improved repair patch for rigid vertical blind slats for repairing broken rigid vertical blind slat upper mounting holes. The repair patch for rigid vertical blind slats comprises a generally rectangular extruded member of resilient pliable material, such as plastic, having an inverted U-shape when viewed in the cross-section. The extruded member has a horizontal longitudinal planar top with identical integral front and rear longitudinal planar flaps projecting downwardly therefrom, the flaps being on parallel planes and being spaced apart such that the upper end of a rigid vertical blind slat may be sandwiched therebetween. The extruded member has a length essentially the same as the width of a vertical blind slat. The extruded member also has a lateral aperture therethrough positioned so as to correspond to the original position of the slats upper mounting hole when installed on the slat end whereby the slat may be reattached as normal to a vertical blind set slat hook. The extruded member additionally has a coating of pressure-sensitive adhesive on the inside surfaces of the flaps whereby the patch may be fixedly connected to the end of the rigid slat. The extruded member further has release paper over the pressure-sensitive adhesive whereby the adhesive is protected from foreign matter and premature adhesion prior to installation on the blind slat. The extruded member moreover has reinforcing strips of rigid material, such as plastic, fixedly connected inside the flaps at the aperture whereby the extruded member is reinforced against breaking due to the weight of the slat being concentrated at the aperture.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved repair patch for vertical blind slats for repairing broken or torn vertical blind slat mounting holes, the repair patch for vertical blind slats comprising a generally rectangular extruded member having a connector thereon for fixedly connecting the extruded member to the end of a vertical blind slat, the extruded member also having an aperture or plurality of apertures therethrough wherethrough an attachment hook of a vertical blind set may be connected whereby the vertical blind slat may be reattached to the blind set thereby restoring its original functionality.

It is therefore an additional object of the present invention to provide a new and improved repair patch for vertical blind slats which has all the advantages of the prior art repair patch for vertical blind slats and none of the disadvantages.

It is another object of the present invention to provide a new and improved repair patch for vertical blind slats which may be easily and efficiently manufactured and marketed.

It is a further object of the present invention to provide a new and improved repair patch for vertical blind slats which is of a durable and reliable construction.

An even further object of the present invention is to provide a new and improved repair patch for vertical blind slats which is susceptible of a low cost of manufacture with regard to both materials and labor, and which accordingly is then susceptible of low prices of sale to the consuming public, thereby making such repair patch for vertical blind slats economically available to the buying public.

Still yet another object of the present invention is to provide a new and improved repair patch for vertical blind slats which provides in the apparatuses and methods of the prior art some of the advantages thereof, while simultaneously overcoming some of the disadvantages normally associated therewith.

Still yet another object of the present invention is to provide a new and improved repair patch for vertical blind slats which will allow reuse of a broken slat thereby maintaining an exact color match with the other slats in the set.

Yet another object of the present invention is to provide a new and improved repair patch for vertical blind slats that may be universally applied to a wide variety of different vertical blind sets thereby precluding the need to manufacture or inventory a large number of different repair patches.

Even still another object of the present invention is to provide a new and improved repair patch for vertical blind slats which is unobtrusive when in use so as not to degrade the appearance of the vertical blind set.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
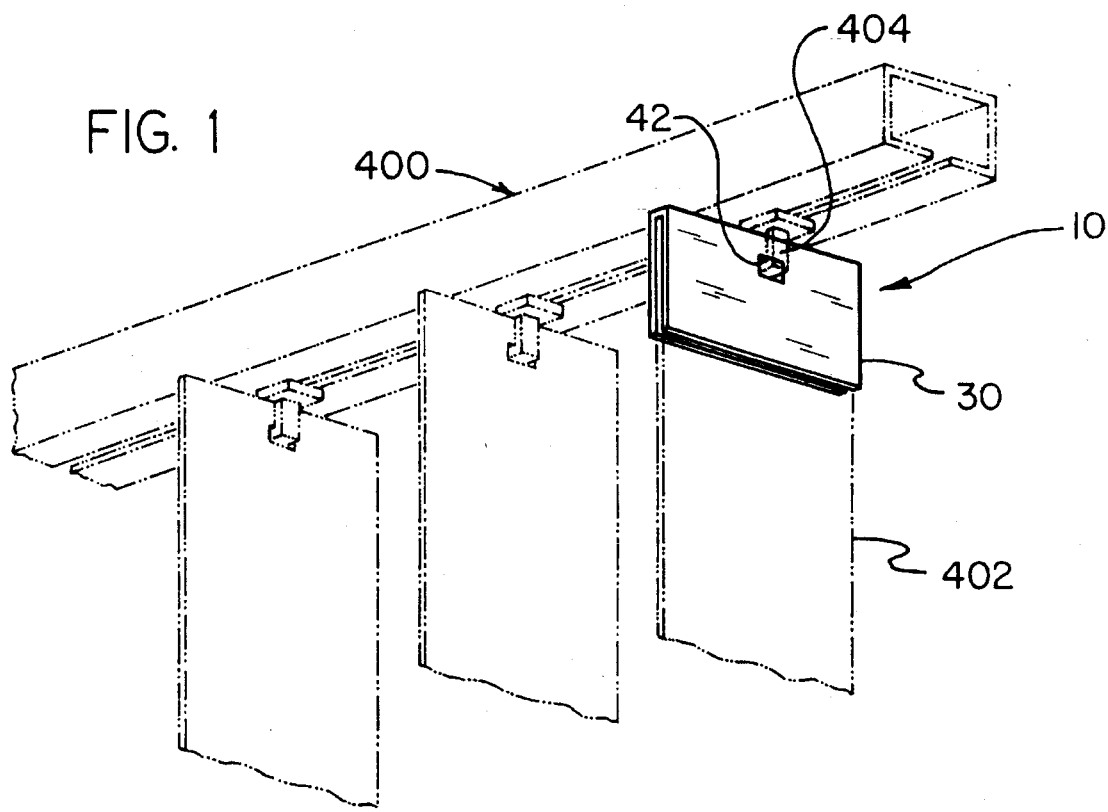
FIG. 1 is a perspective view of a first embodiment of the present invention illustrating its manner of use.

With reference now to the drawings, and in particular to FIG. 1 thereof, a new and improved repair patch for vertical blind slats embodying the principles and concepts of the present invention and generally designated by the reference numeral 10 will be described.

From an overview standpoint, the repair patch for vertical blind slats is adapted for use in repairing broken or torn vertical blind slat mounting holes. See FIG. 1.

Figure 2:
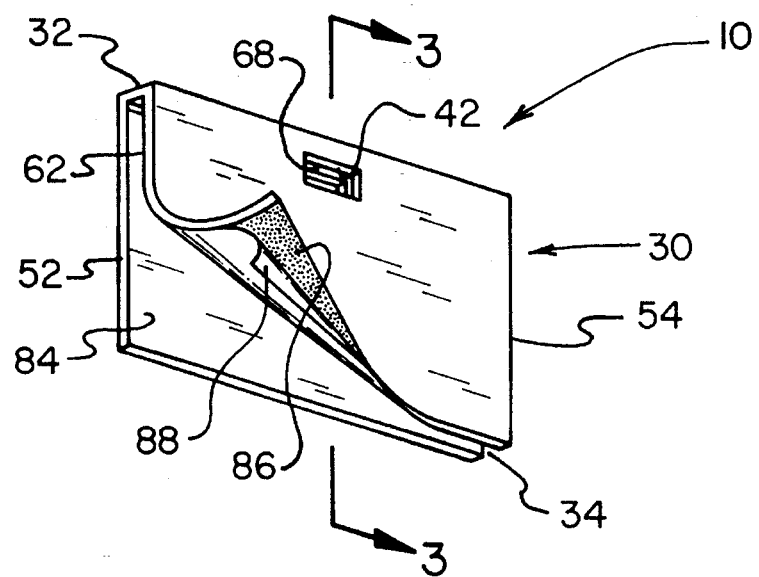
FIG. 2 is a perspective view of the invention of FIG. 1 illustrating its manner of construction.
Figure 3:
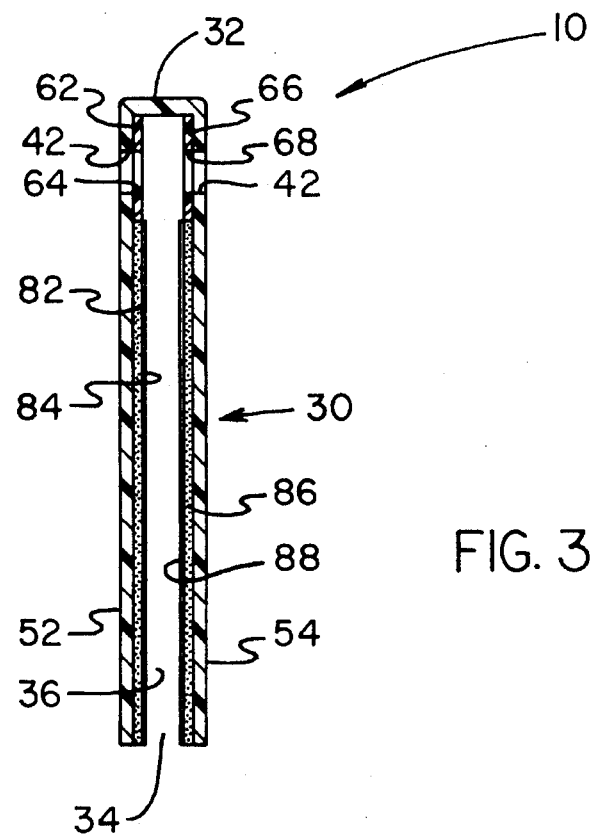
FIG. 3 is a sectional view of the invention of FIG. 2 taken along the line 3—3.

With reference now to FIGS. 1, 2, and 3 and more specifically, it will be noted that a repair patch for vertical blind slats 10 for repairing broken rigid vertical blind slat 402 upper mounting holes is shown. The repair patch for rigid vertical blind slats 10 comprises a generally rectangular extruded member 30 of resilient pliable material, such as plastic, having an inverted U-shape when viewed in the cross-section.

The extruded member 30 has a horizontal longitudinal planar top 32 with identical integral front and rear longitudinal planar flaps 52 and 54 projecting downwardly therefrom, the flaps 52 and 54 being on parallel planes and being spaced apart such that the upper end of a rigid vertical blind slat 402 may be sandwiched therebetween. The extruded member 30 has a length essentially the same as the width of a vertical blind slat.

The extruded member 30 also has a lateral aperture 42 therethrough positioned so as to correspond to the original position of the slats upper mounting hole when installed on the slat end whereby the slat may be reattached as normal to a vertical blind set slat hook 404. The extruded member 30 additionally has a coating of pressure-sensitive adhesive 82 and 86 on the inside surfaces of the flaps 52 and 54 whereby the patch 10 may be fixedly connected to the end of the rigid slat 402.

The extruded member 30 further has release paper 84 and 88 over the pressure-sensitive adhesive 82 and 86 whereby the adhesive is protected from foreign matter and premature adhesion prior to installation on the blind slat 402. The extruded member 30 moreover has reinforcing strips 62 and 66 of rigid material, such as plastic, fixedly connected inside the flaps 52 and 54 at the aperture 42 whereby the extruded member 30 is reinforced against breaking due to the weight of the slat 402 being concentrated at the aperture 42.

Figure 4:
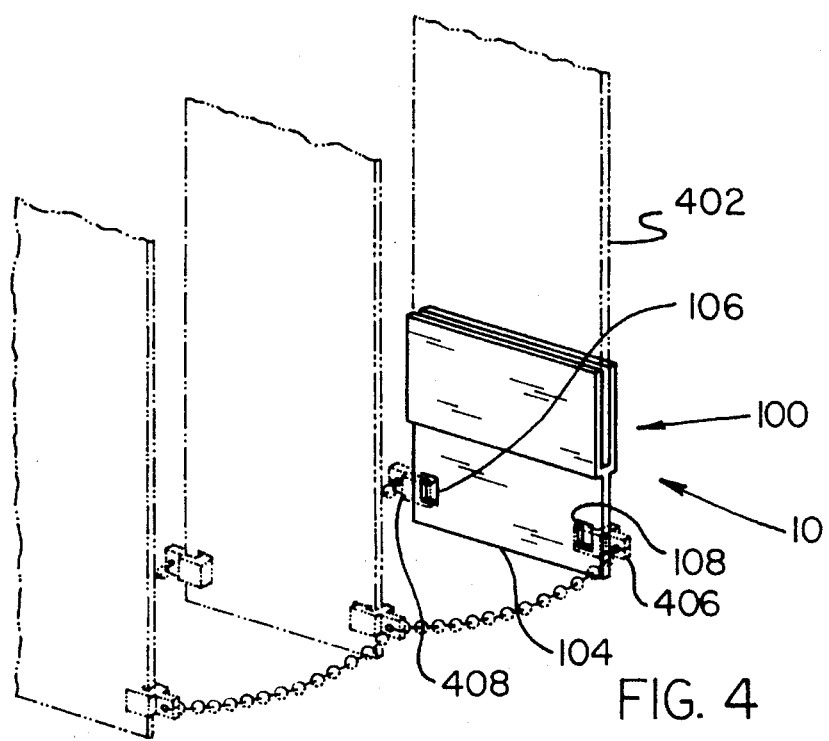
FIG. 4 is a perspective view of a second embodiment of the present invention illustrating its manner of use.
Figure 5:
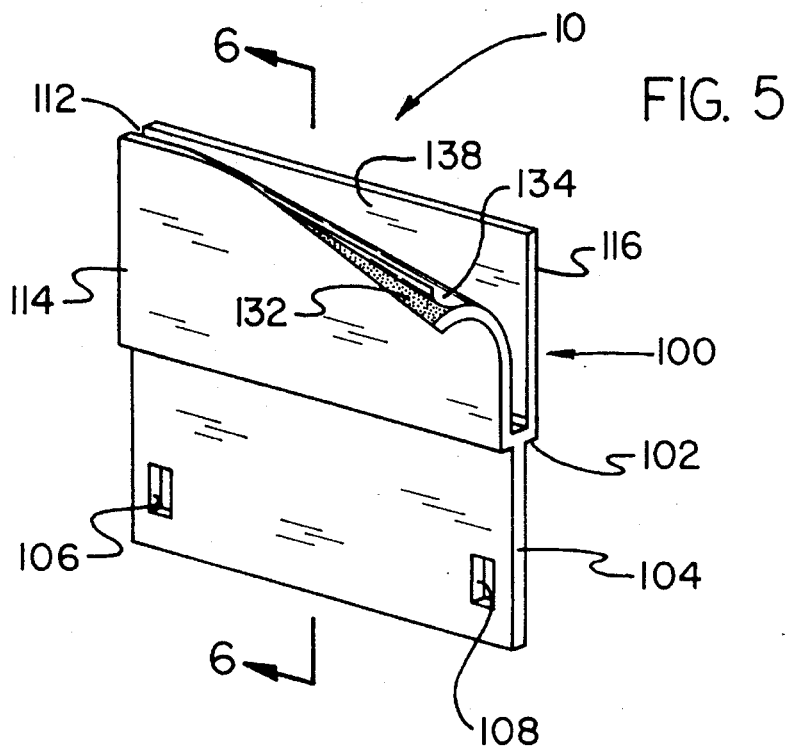
FIG. 5 is a perspective view of the invention of FIG. 4 illustrating its manner of construction.
Figure 6:
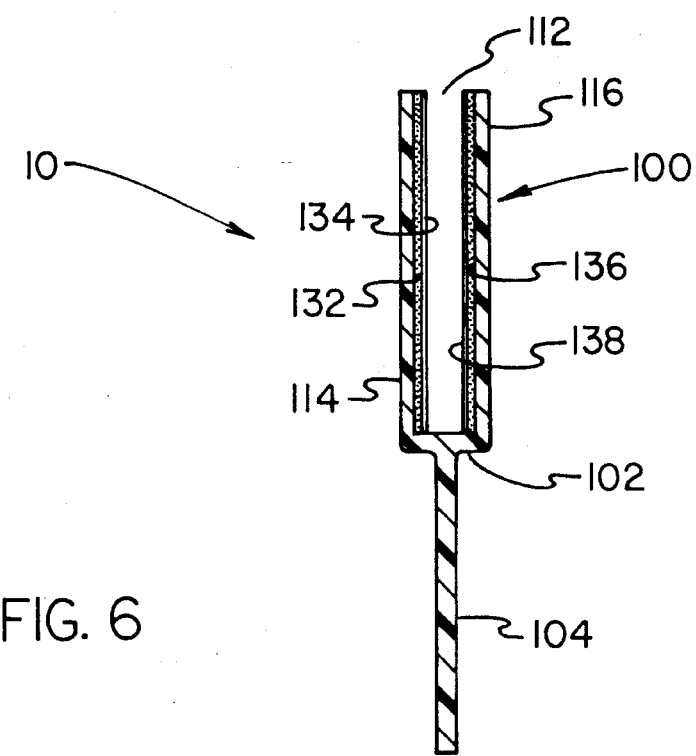
FIG. 6 is a sectional view of the invention of FIG. 5 taken along the line 6—6.

FIGS. 4, 5, and 6 show a second embodiment of the new and improved repair patch for rigid vertical blind slats 10 for repairing broken rigid vertical blind slat lower mounting holes. The repair patch for rigid vertical blind slats 10 comprises a generally rectangular extruded member 100 of resilient pliable material, such as plastic, having a Y-shape when viewed in the cross-section. The extruded member 100 has identical integral front and rear longitudinal planar flaps 114 and 116 projecting upwardly from a longitudinal horizontal shoulder 102, the flaps 114 and 116 being on parallel planes. The flaps 114 and 116 are spaced apart such that the lower end of a rigid vertical blind slat 402 may be sandwiched therebetween.

The extruded member 100 has a length essentially the same as the width of a vertical blind slat 402. The extruded member 100 also has an integral longitudinal planar tab 104 projecting downwardly from the horizontal shoulder 102 and extending the length thereof, the tab 102 having a plurality of lateral apertures 106 and 108 therethrough positioned so as to correspond to the original position of the slats lower mounting holes when installed on the slat end whereby the slat 402 may be reattached as normal to vertical blind set slat hooks 406 and 408.

The extruded member 100 additionally has a coating of pressure-sensitive adhesive 132 and 136 on the inside surfaces of the flaps 114 and 116 whereby the patch 10 may be fixedly connected to the end of the rigid slat 402. The extruded member 100 further has release paper 134 and 138 over the pressure-sensitive adhesive 132 and 136 whereby the adhesive is protected from foreign matter and premature adhesion prior to installation on the blind slat.

Figure 7:
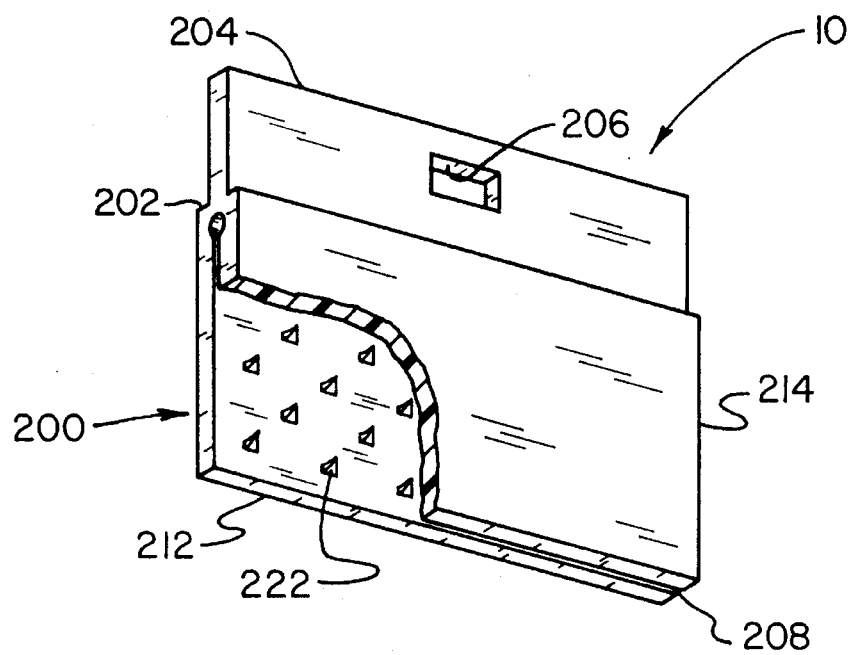
FIG. 7 is a perspective view of a third embodiment of the present invention showing its manner of construction.

A third embodiment of the new and improved repair patch for fabric vertical blind slats 10, for repairing torn fabric vertical blind slat upper mounting holes, is shown in FIG. 7. The repair patch for fabric vertical blind slats 10 comprises a generally rectangular extruded member 200 of rigid material, such as plastic, having an inverted Y-shape when viewed in the cross-section.

The extruded member 200 has integral longitudinal planar jaws 212 and 214 projecting downwardly from a longitudinal horizontal shoulder 202, the jaws 212 and 214 being on parallel planes and being spaced apart such that the upper end of a fabric vertical blind slat (not shown) may be sandwiched therebetween. The extruded member 200 has a length essentially the same as the width of a vertical blind slat.

The extruded member 200 also has an integral longitudinal planar tab 204 projecting upwardly from the horizontal shoulder 202 and extending the length thereof. The tab 204 has a lateral aperture 206 therethrough positioned so as to correspond to the original position of the slats upper mounting hole when installed on the slat end whereby the slat may be reattached as normal to vertical blind set slat hook (not shown). The extruded member 200 additionally has a plurality of inwardly projecting barbs 222 on the inside surfaces of the jaws 212 and 214 for catching and trapping the woven fibers of the fabric slat whereby the patch 10 may be fixedly connected to the end of the slat.

Figure 8:
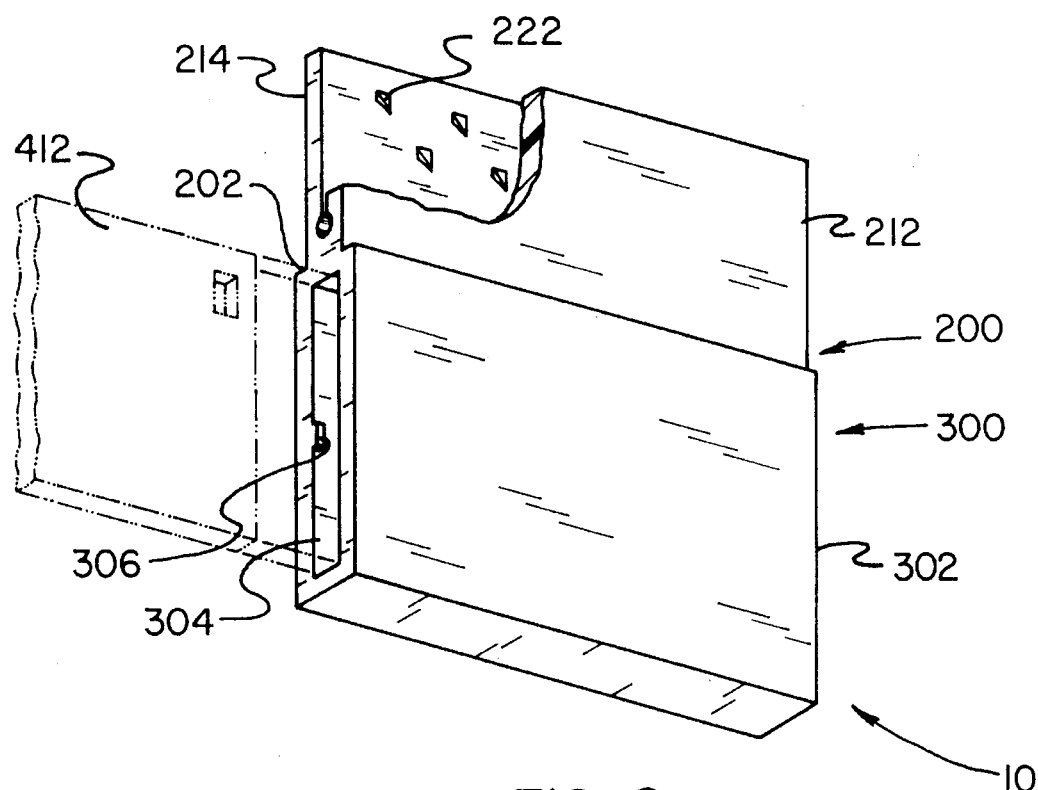
FIG. 8 is a perspective view of a first modification of the invention of FIG. 7 illustrating its manner of construction.

Shown in FIG. 8 is a first modification of the third embodiment of the repair patch for fabric vertical blind slats 10 wherein the integral longitudinal planar tab of the extruded member 200 is replaced by an integral longitudinal receptacle 300 for receiving a bottom weight 412 of a fabric vertical blind slat therein. The receptacle 300 comprises a cavity 304 having a size and shape to receive the existing weight from the damaged fabric vertical blind slat. The receptacle 300 also includes a locking tab 306 whereby the slat weight 412 is snapidly locked in place within the cavity 304. The repair patch 10 is adapted for use in repairing a torn bottom weight pocket of a fabric vertical blind slat (not shown).

Figure 9:
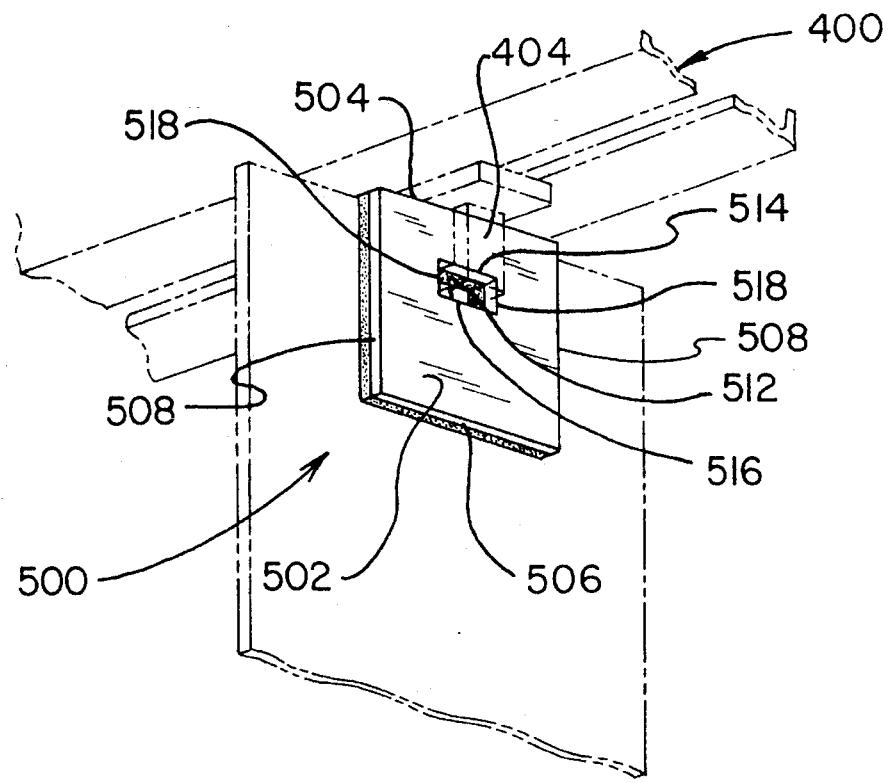
FIG. 9 is an illustration of a final alternate embodiment of the invention.
Figure 10:
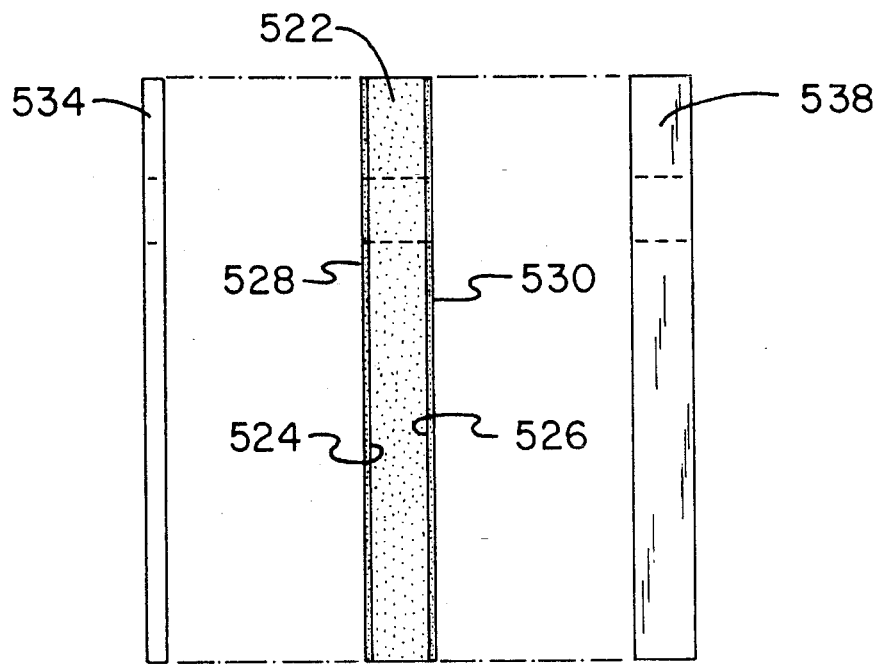
FIG. 10 is a further illustration of the alternate embodiment of FIG. 9.

Shown in FIGS. 9 and 10 are another alternate embodiment of the invention.

In such embodiment, the repair apparatus is a patch 500 in the preferred embodiment, to such patches are provided on opposite sides of the blind in facing relationship with each other. Each patch is a laminate 502. It is a generally rectangular configuration, preferably a square. It has parallel upper and lower edges 504 and 506. It also has parallel side edges 508 extending between the upper and lower edges.

The laminate also includes an aperture 512 extending through the entire laminate. The aperture is preferably located adjacent to the upper edge 504. The aperture is fabricated into a rectangle having parallel upper and lower edges 514 and 516. It also has parallel short edges 518 between the upper and lower edges.

Now with greater reference to FIG. 10, the laminate is formed of three components, the first component is a fixed intermediate layer 522. It is preferably fabricated of an elastomeric foam such as polyurethane. Other foams of a flexible, compressible nature could be utilized. The intermediate layer 522 has opposed faces 524 and 526. Such faces are each provided with an adhesive 528 and 530.

Located over the first face 524 and secured thereto by a layer of adhesive 528 is a first exterior layer 534. Such layer is preferably is of a flexible plastic. It is adapted to be peeled away from its associated face 524 of the intermediate layer when secured to the blind to be repaired. A suitable material for such peelable layer is polyethylene film.

A second exterior layer 538 is provided on the opposite face 526 of the intermediate layer 522 and secured thereto by adhesive 530. Such second exterior layer 538 is preferably of a material of limited flexibility. Such second layer is preferably coordinated with the blind to be repaired, the coordination being in terms of color and, preferably, flexibility. The second exterior layer 538 is essentially permanently adhered to the face 526 of the intermediate layer 522 through adhesive 530.

Inasmuch as vertical blinds to be repaired are normally formed with a limited curvature, the sizes and other functional and structural characteristics of the laminate are significant to allow curving of the laminate and conforming of the intermediate layer to effect the most secure bond between the laminate and the blind for an essentially permanent repair. In the preferred embodiment, the patch or laminate 500 is a square about one inch on each side. The aperture is a rectangle about 3/8 inch wide and about 1/8 inch high. The upper edge of the aperture is about 1/4 inch from the upper edge of the patch. The intermediate layer is about 1/16 inch thick. The first exterior layer is about 1/64 inch thick or, preferably thinner. The second intermediate layer is normally about 1/32 inch thick.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A repair patch for vertical blinds comprising:

a laminate formed of two plates positionable on opposite sides of a blind to be repaired in a rectangular configuration with parallel upper and lower edges and with parallel side edges therebetween, each of the plate includes a rectangular aperture extending therethrough adjacent to the upper edge, the aperture having parallel long upper and lower edges and parallel short side edges therebetween, the upper edge of the aperture being about 1/4 inch from the upper edge of the patch;

each of the plate includes a thick intermediate layer of foam with a first face and a second face, a first exterior layer of a flexible plastic on the first face with an adhesive therebetween and adapted to be peeled from the intermediate layer when coupled to a blind to be repaired, and a second exterior layer of a material of limited flexibility coordinated in color to the blind to be repaired, the second exterior layer being permanently adhered to the second face of the intermediate layer with adhesive therebetween.

2. The patch as set forth in claim 1 wherein the patch has a width of about 1 inch, the aperture has a width of about 3/8 inch and the intermediate layer is about 1/16 inch thick.

3. The patch as set forth in claim 1 wherein the patch is about a 1 inch square, the aperture is about 3/8 inch by 1/8 inch, the intermediate layer is about 1/16 inch thick, the first exterior layer is about 1/64 inch thick, and the second intermediate layer is about 1/32 inch thick.

4. The repair patch as set forth in claim 1 and further including a plurality of vertical blind components, at least one of said vertical blind components having secured thereto said laminate.

* * * * *